United States Patent
Easton

[15] 3,668,527
[45] June 6, 1972

[54] CRYSTAL OSCILLATOR FOR SATELLITE

[72] Inventor: Roger L. Easton, Oxon Hill, Md.

[73] Assignee: The United States of America as represented by the Secretary of the Navy

[22] Filed: Nov. 3, 1970

[21] Appl. No.: 86,496

Related U.S. Application Data

[63] Continuation-in-part of Ser. Nos. 785,883, Dec. 23, 1968, Pat. No. 3,560,880, and Ser. No. 806,640, Mar. 12, 1969, Pat. No. 3,600,951.

[52] U.S. Cl............................325/115, 325/119, 325/184, 331/69, 219/210
[51] Int. Cl..........................................................H04b 1/04
[58] Field of Search ..................325/111, 115, 119, 184; 331/158, 68, 69; 219/210

[56] References Cited

UNITED STATES PATENTS

| | | |
|---|---|---|
| 3,287,658 | 11/1966 | Sulzer.....................................331/69 |
| 2,707,234 | 4/1955 | Dostal.....................................331/69 |
| 3,242,429 | 3/1966 | Akerman, Jr. et al. ................325/115 |

*Primary Examiner*—Benedict V. Safourek
*Attorney*—R. S. Sciascia, Arthur L. Branning and J. G. Murray

[57] ABSTRACT

Structure and apparatus located on a satellite which control the environment of a crystal oscillator for the purpose of attaining extreme frequency stability and reducing the problems of pre-flight testing and adjusting. The oscillator is located in an evacuated chamber together with heat shields and ovens.

4 Claims, 1 Drawing Figure

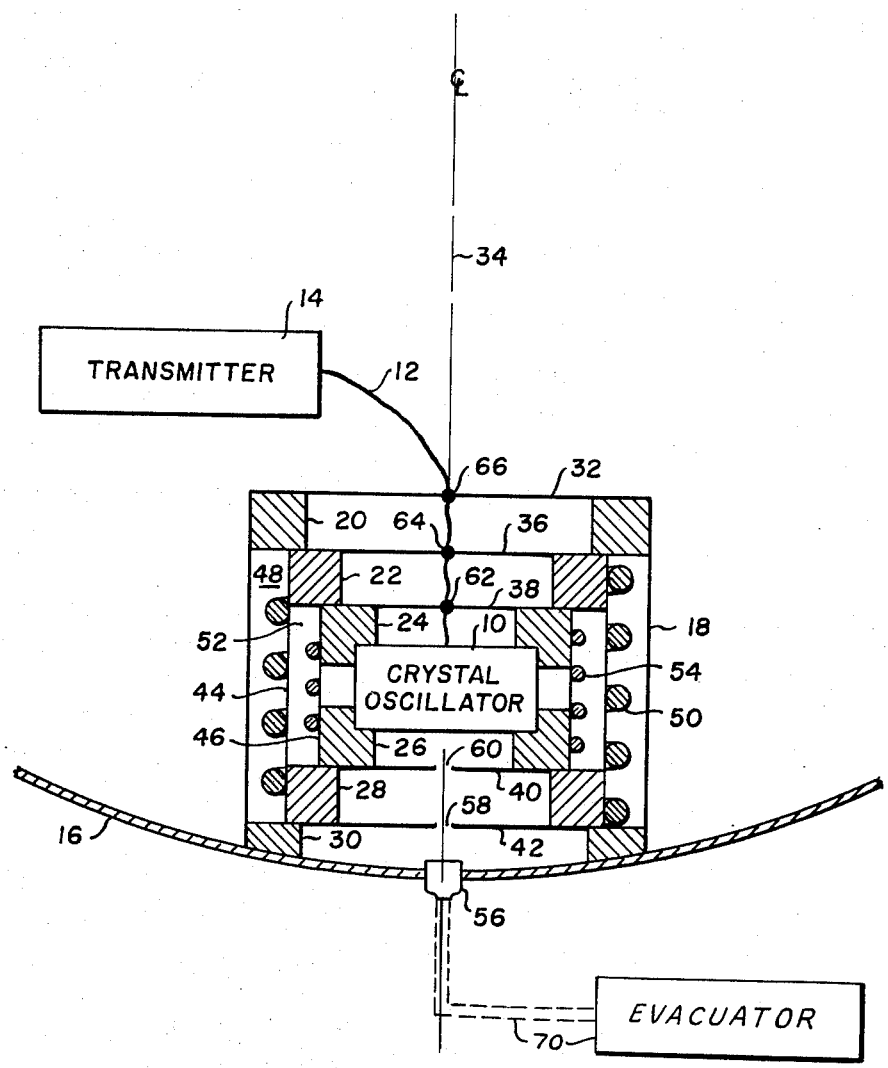

CRYSTAL OSCILLATOR FOR SATELLITE

CROSS REFERENCE TO RELATED APPLICATIONS

This application is a continuation-in-part of application, Ser. No. 785,883 for Crystal Oscillator With Automatic Compensation For Frequency Drift Due To Aging, filed Dec. 23, 1968 by Roger L. Easton and Charles A. Bartholomew and Ser. No. 806,640 for Arrangement To Compensate For Crystal Orientation Change, filed Mar. 12, 1969 by Roger L. Easton now U.S. Pat. Nos. 3,560,880 and 3,600,951, respectively.

STATEMENT OF GOVERNMENT INTEREST

The invention described herein may be manufactured and used by or for The Government of the United States of America for governmental purposes without the payment of any royalties thereon or therefor.

BACKGROUND OF THE INVENTION

Navigation is one of the oldest arts known to man. Early navigation consisted of measuring the altitude of known stars to obtain latitudes. The ancient navigator then sailed east or west to the proper longitude. To determine longitude, a timepiece was required. For this purpose the moon, and later the moons of Jupiter, were used prior to the development of chronometers. With the relatively very recent advent of radio, the navigator become independent of cloud cover in obtaining "fixes" but the accuracy of such fixes were not significantly improved over those obtained by celestial techniques.

Upon the introduction of artificial earth satellites, and navigational systems based on the use of these satellites, a new order of navigational accuracy became possible whereby the navigator's position could be routinely determined to within a few tenths of a mile.

One of the new satellite navigational systems is termed TIMATION, an acronym for time navigation. In this system the satellites contain stable oscillators that precisely time and control the transmissions. When these transmissions are received by the navigator he compares them with output signals of his own precision oscillator and from this comparison determines his range from the satellite. Since the satellite's position is precisely known it is a matter of relatively simple and well known technique to determine the position of the navigator's ship (or airplane).

Because the TIMATION technique requires that both the satellites and the navigator have precision clocks (oscillators) and in consideration of factors of cost, weight, space, etc., it has become an obviously highly desirable goal to develop a crystal oscillator installation on the satellites which has the same order of stability as an atomic clock, i.e., to be stable within an error rate of a few parts in $10^{12}$ per day. To attain this goal, the Naval Research Laboratory and other laboratories have embarked on research programs intended to raise the stability of crystal oscillators.

These programs are, in a way, an outgrowth of the work of early experimenters who have long recognized that the uncompensated natural frequencies of crystals change for many reasons and who have fully developed appropriate compensatory circuitry for the large frequency shifts which are due to changes of environmental parameters, such as temperature, pressure, etc. However, the present programs are in many ways different from the prior work toward frequency stability, primarily because of the degree of precision presently being sought. For example, the cross referenced applications, Ser. Nos. 785,883 and 806,640 now U.S. Pat. Nos. 3,560,880 and 3,600,951, respectively relate to changes to the natural frequency of a crystal due to aging and to gravity orientations; changes which are so small as to have hitherto been largely ignored but which, in developing a crystal oscillator having the desired (atomic) stability level, must be considered and compensated for.

SUMMARY OF THE INVENTION

The present invention provides the design of a housing which can be installed on the satellite and which minimizes temperature and pressure changes to the environment of the crystal and thereby both greatly increases the frequency stability of the crystal oscillator and largely reduces the extent and complexity of the compensation (which is never perfect) that is necessary because of changes in temperature and pressure. The invention provides a further advantage in reducing the power loading on the satellite electrical system. Yet another advantage provided by the invention is that it allows meaningful pre-flight tests and adjustments without the use of an evacuated test area; i.e., the oscillator can be operated on earth in a space-like environment without extensive laboratory facilities.

The many advantages of the invention are obtained by providing an evacuated chamber on the satellite and locating therein the highly stable crystal oscillator together with one or more ovens and heat shields.

OBJECTS OF THE INVENTION

It is, therefore, an object of the invention to provide means to improve the frequency stability of a crystal oscillator.

Another object is to provide means on an artificial earth satellite to improve the frequency stability of a crystal oscillator which is part of a navigational system.

Yet another object of the invention is the provision, on an artificial earth satellite which is part of a navigational system, of an evacuated chamber which contains a crystal oscillator, heat shields and oven and which functions to improve the frequency stability of the crystal oscillator and which reduces the problems of pre-flight testing and adjusting.

DESCRIPTION OF THE INVENTION

Other objects and features of the invention will become apparent to those skilled in the art as the disclosure is made in the following description of a preferred embodiment of the invention of the invention as illustrated in the accompanying sole FIGURE of the drawing.

DESCRIPTION OF THE PREFERRED EMBODIMENT

Referring now to the drawing wherein the sole FIGURE shows a crystal oscillator 10 which is connected by cable 12 to control the broadcast frequencies of a transmitter 14. Typically the oscillator 10 and transmitter 14 are located within a satellite, the outer shell 16 of which is illustrated. Further, the oscillator 10 and transmitter 14 are typically included in a navigational system, such as the TIMATION system previously described, and for this reason the oscillator 10 is desirably extremely frequency stable and is designed to include appropriate compensatory structure and circuitry which, per se, are not part of the present invention.

Crystal oscillator 10 is supported within an outer casing 18 by structural members 20, 22, 24, 26, 28 and 30 which, while illustrated by metallic cross-hatching, could also be appropriate forms of plastic or other material with good heat insulation properties. A cover 32 completes the air-tight chamber which encloses the crystal oscillator 10. As shown by the center line 34, this air-tight chamber is preferably cylindrically shaped but it will be evident to the reader that other shapes could be conveniently used.

As shown in the figure, the structural members 20, 22, 24, 26, 28 and 30 support heat shields 36, 38, 40 and 42 and oven walls 44 and 46. An outer oven 48 is located between the outer casing 18 and oven wall 44 and includes a heating element 50. The inner oven 52 is located between the oven walls 44 and 46 and includes heating element 54. Although typically the ovens 48 and 52 are controlled to operate as a double proportional oven (by circuitry not per se a part of this invention), in some cases the changes in the heat balance during orbitting of the satellite may be such that a Thermal Electric cooler is used in place of one of the ovens.

Fitting 56 and evacuator 70 can be otherwise located but are shown as being in the satellite skin 16 and are used to evacuate the crystal oscillator chamber. Leakage paths through holes 58 and 60 and through grommets 62 and 64 and through other paths not illustrated, enable the evacuation of the entire crystal oscillator chamber through the single fitting 56. The reader will, of course recognize that the grommet 66 in cover 32 must be air-tight, and could assume the form of a disconnect plug in the cable 12.

The structure and function of the preferred embodiment of the invention is by now apparent. After the satellite is fabricated, the oscillator chamber is evacuated by use of fitting 56 and the necessary pre-flight tests and adjustments are made, advantageously without requiring extensive environmental laboratory facilities.

In the typical operational use, as part of the TIMATION system, the crystal oscillator 10 and the signal broadcast by transmitter 14 must be extremely frequency stable. Both the oscillator and the transmitter are located on an artificial earth satellite, the outer shell 16 of which is illustrated. To obtain the frequency stability required, it is desirable that the ambient temperature and pressure parameters of the crystal oscillator 10 be limited to very small excursions during the orbits of the satellite around the earth, during which the satellite is alternately shielded from and exposed to the radiations of the sun. To limit the ambient pressure and temperature excursions, the crystal oscillator 10 is placed in an air-tight chamber formed by shell 16, casing 18 and cover 32 and which is evacuated through the fitting 56. The evacuation is assisted by leakage through holes 58 and 60 and through grommets 62 and 64 in the heat shield structure within the chamber. The vacuum in the chamber also reduces both the pressure variations in the chamber and the heat transfer to and from the crystal oscillator; this latter feature being also assisted by the heat shields 36, 38, 40 and 42 and is advantageous in that it reduces the electrical load imposed on the satellite electrical system by the ovens 48 and 52 which control the ambient temperature of the crystal oscillator.

It will be recognized that the invention disclosed provides, on an artificial earth satellite which is part of a navigation system, an evacuated chamber which contains a crystal oscillator, heat shields and ovens and which functions to improve the frequency stability of the crystal oscillator and which reduces the problems of pre-flight testing and adjusting. Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. In a navigation system wherein artificial earth satellites broadcast signals of extreme frequency stability, a crystal oscillator installation on said satellite comprising:
   an air-tight chamber;
   evacuating means connected to said chamber for evacuating said chamber;
   a crystal oscillator supported within said chamber;
   a plurality of oven means located within said chamber and surrounding said crystal oscillator and extending along and about an axis for maintaining constant the ambient temperature of said crystal oscillator and
   heat shields substantially perpendicular to said axis and located on two sides of said crystal oscillator and within said oven means.

2. The apparatus of claim 1, wherein one of said plurality of oven means comprises a cooling means.

3. An artificial earth satellite, particularly useful in a navigation system, comprising:
   transmitter means for broadcasting signals of extreme frequency stability;
   an air-tight chamber;
   evacuating means connected to said chamber for evacuating said chamber;
   a crystal oscillator connected to said transmitter means and located in said chamber;
   plurality of oven means located within said chamber for maintaining constant the ambient temperature of said crystal oscillator and
   at least two heat shields located within said plurality of oven means and shielding said crystal oscillator from opposite sides.

4. An artificial earth satellite, particularly useful in a navigation system, comprising:
   transmitter means for broadcasting signals of extreme frequency stability;
   an air-tight chamber;
   evacuating means connected to said chamber for evacuating said chamber;
   a crystal oscillator connected to said transmitter means and located in said chamber;
   a plurality of oven means located within said chamber and surrounding said crystal oscillator and extending along and about an axis for maintaining constant the ambient temperature of said crystal oscillator and
   heat shields substantially perpendicular to said axis and located on two sides of said crystal oscillator and within said oven means.

* * * * *